United States Patent
Senn et al.

(10) Patent No.: US 9,233,800 B2
(45) Date of Patent: Jan. 12, 2016

(54) TRANSPORTING APPARATUS AND TRANSPORTING METHOD FOR CONTAINER-HANDLING INSTALLATION, AND CONTAINER-HANDLING INSTALLATION WITH SUCH A TRANSPORTING APPARATUS

(75) Inventors: Konrad Senn, Regensburg (DE); Wolfgang Hahn, Neutraubling (DE)

(73) Assignee: KRONES AG (DE)

( * ) Notice: Subject to any disclaimer, the term of this patent is extended or adjusted under 35 U.S.C. 154(b) by 59 days.

(21) Appl. No.: 13/318,779

(22) PCT Filed: Apr. 20, 2011

(86) PCT No.: PCT/EP2011/056291
§ 371 (c)(1),
(2), (4) Date: Sep. 21, 2012

(87) PCT Pub. No.: WO2011/131704
PCT Pub. Date: Oct. 27, 2011

(65) Prior Publication Data
US 2013/0026005 A1    Jan. 31, 2013

(30) Foreign Application Priority Data

Apr. 22, 2010   (DE) .......................... 10 2010 018 153

(51) Int. Cl.
*B65G 35/08*    (2006.01)
*B65G 19/02*    (2006.01)
(Continued)

(52) U.S. Cl.
CPC .......... *B65G 47/082* (2013.01); *B65G 47/5113* (2013.01); *B65G 47/842* (2013.01)

(58) Field of Classification Search
None
See application file for complete search history.

(56) References Cited

U.S. PATENT DOCUMENTS 3,601,246 A * 8/1971 Dubois ................. B65G 23/00
                                            198/334
5,161,664 A   11/1992 LeBras
(Continued)

FOREIGN PATENT DOCUMENTS

DE     2 115 292       12/1971
DE     35 44 201 A1     6/1986
(Continued)

OTHER PUBLICATIONS

German Search Report dated Nov. 10, 2010, issued in corresponding German Application No. 10 2010 018 153.6.

(Continued)

*Primary Examiner* — Kavel Singh
(74) *Attorney, Agent, or Firm* — Hayes Soloway P.C.

(57) ABSTRACT

A transporting apparatus serves for transporting containers in a container-handling installation, which has a first container-handling arrangement for handling containers, and a second container-handling arrangement, which is arranged downstream of the first handling arrangement and serves for handling the containers once they have been handled by the first container-handling arrangement. The transporting apparatus includes a transporting path, which has its entire length arranged between the first and second container-handling arrangement and along which the containers can be transported from the first container-handling arrangement to the second container-handling arrangement. The apparatus includes at least one transporting element, which is mounted in a movable manner on the transporting path and is intended for retaining and transporting a container. The transporting path and the at least one transporting element are configured such that the at least one transporting element, en route between the first and second container-handling arrangements, compensate for a difference in speeds of transportation of the containers in the first and second container-handling arrangements.

22 Claims, 5 Drawing Sheets

(51) Int. Cl.
*B65G 43/00* (2006.01)
*B65G 47/74* (2006.01)
*B65G 47/08* (2006.01)
*B65G 47/51* (2006.01)
*B65G 47/86* (2006.01)

(56) References Cited

U.S. PATENT DOCUMENTS

| | | | |
|---|---|---|---|
| 5,261,520 A | 11/1993 | Duke | |
| 5,558,200 A * | 9/1996 | Whitby | B65G 17/323 198/470.1 |
| 5,607,045 A * | 3/1997 | Hermann Kronseder | B08B 9/42 198/476.1 |
| 6,209,710 B1 * | 4/2001 | Mueller | B65G 17/323 198/470.1 |
| 6,520,318 B1 * | 2/2003 | Humele | B65G 47/847 198/470.1 |
| 2003/0230941 A1 | 12/2003 | Jacobs | |

FOREIGN PATENT DOCUMENTS

| | | |
|---|---|---|
| DE | 41 33 114 A1 | 4/1993 |
| DE | 10 2008 035 004 A1 | 1/2010 |
| EP | 0 496 046 A1 | 7/1992 |
| EP | 0 769 459 A1 | 4/1997 |
| EP | 1 123 886 A1 | 8/2001 |
| EP | 1 327 591 A1 | 7/2003 |
| EP | 1 645 340 A1 | 4/2006 |
| EP | 1 767 474 A1 | 3/2007 |
| EP | 2 301 867 A2 | 3/2011 |
| RU | 2 198 835 C2 | 2/2003 |
| WO | 03/047977 A2 | 6/2003 |

OTHER PUBLICATIONS

International Search Report dated Jul. 19, 2011, issued in corresponding International Application No. PCT/EP2011/056291.
Chinese Office Action dated Apr. 18, 2014, issued in corresponding Chinese Application No. 201180002365.2.
Russian Office Action dated Mar. 24, 2015, issued in corresponding Russian Application No. 2011145362/11.

* cited by examiner

TRANSPORTING APPARATUS AND TRANSPORTING METHOD FOR CONTAINER-HANDLING INSTALLATION, AND CONTAINER-HANDLING INSTALLATION WITH SUCH A TRANSPORTING APPARATUS

CROSS-REFERENCE TO RELATED APPLICATION

This application is filed under 35 U.S.C. 371 as a U.S. national phase application of PCT/EP2011/056291, having an international filing date of Apr. 20, 2011, which claims the benefit of German Patent Application No. 10 2010 018 153.6, having a filing date of Apr. 22, 2010, both of which are incorporated herein by reference.

TECHNICAL FIELD

The invention relates to a transport unit and a transport method for a container treatment system as well as to a container treatment system having such a transport unit.

BACKGROUND

In container transport systems, preforms made from plastics, such as for example polyethylene terephthalate (PET), polypropylene (PP) etc., are moulded into containers such as for example bottles, and are subsequently labelled, filled, packaged etc. To this end, the preforms transported through the container treatment system along a transport path are heated in a heating device, so that they can then be expanded and stretched into plastic containers in a stretch blow moulding apparatus by means of a stretch blow moulding process. Subsequently, the plastic containers are transported by a transport system to further treatment apparatus such as for example a cleaning device, a labelling device, a filling device, a sorting device, a packaging device, etc.

The transport systems used for this purpose are so-called neck-handling systems, in which a retaining clamp of the transport system grips above or below a support ring of the preforms or the expanded container, in order to hold the respective preform or expanded container on the transport system and to transport it in this way through the container treatment system. Usually, the retaining clamps are fastened in a star shape around a driving shaft, so that this is also referred to as a transport star. Due to such an arrangement around the driving shaft, the retaining clamps generally carry out a circular or at least approximately circular movement. In this respect, rigid transport stars, sliding transport stars and partial-delay transport stars are distinguished. In the case of rigid transport stars, the retaining clamps rigidly follow the circular path or the transport path determined by the transport star. In the case of sliding transport stars, the retaining clamps can partially leave the transport path determined by the transport star. In the case of partial-delay transport stars, the retaining clamps can also leave the pitch on the transport path determined by the transport star.

However, what all of these conventional transport systems have in common is that all the retaining clamps follow the same travel-time profile and the transport path is substantially circular. This is in particular disadvantageous in a transport system between a heating unit for preforms and a stretch blow moulding unit in a case where large preforms are to be heated. In such a case, the heating unit has to run more slowly than in the case of smaller preforms, whereas the subsequent stretch blow moulding unit can run at the same speed for both preform sizes, since in the case of large preforms, for example, only every other blow mould of the stretch blow moulding unit is loaded with the heated large preforms.

EP 1 645 340 A1 describes a sorting device and a conveying device for piece goods, wherein retaining devices for holding the piece goods on individual transport units are arranged, which can be individually controlled, so that they can be carried from a loading place to a selectable delivery place. By this means, piece goods held on the retaining devices can be transported along a substantially circular transport path and can be diverted and thus channeled by the latter to side transport paths as a function of the type of piece goods held. The side transport paths are designated for special types of piece goods, in order to carry the piece goods to the delivery place intended for them. Such a sorting device and conveying device, however, continues to adhere to a fixed travel-time profile of the transport units on the transport path, simply because it doesn't need another one, and thus approximately corresponds to the above-mentioned sliding star. Therefore, the problem mentioned above as an example, namely that of changing from small preforms to large ones and vice versa, cannot be solved.

DE 41 33 114 A1 shows a conveyor system for piece goods such as bottles, containers and the like, which has a conveying path formed as a long stator motor with stationary electric/electronic components and brushless rotors for conveying piece goods. The conveying path carries the piece goods past or through several treatment stations arranged one after the other. Because its entire conveying path is formed as a long stator motor, such a conveying system is clearly more expensive to procure and to maintain than the above described transport stars.

It may therefore be desirable to provide a transport unit and a transport method for a container treatment system, which enable the transport process to be carried out independently by two different container treatment apparatus of a container treatment system in a cost effective manner.

SUMMARY

A transport unit is used for transporting containers in a container treatment system comprising a first container treatment apparatus for treating containers and a second container treatment apparatus that is disposed downstream of the first treatment apparatus and is used for treating the containers following a treatment by the first container treatment apparatus. The transport unit comprises a transport path which is arranged over its entire length between the first and second container treatment apparatus and along which the containers can be transported from the first container treatment apparatus to the second container treatment apparatus, and at least one transport member for holding and transporting a container, which is mounted or supported on the transport path and can in particular also be moved in respect of and relative to the transport path. Here, the transport path and the at least one transport member are preferably designed in such a way that the at least one transport member can compensate at least at times along its path between a first and second container treatment apparatus a speed differential of a transport of the container in the first and second container treatment apparatus.

This is understood to mean that whilst the transport unit is technically capable of compensating differences in speed, however, this is not necessarily always required in all applications.

Advantageously, the transport path can be designed substantially in any desired geometrical form. Thus, it would for example be conceivable that in certain applications, differences in speed may not supposed to be compensated, but that a special geometric form of the transport path is needed.

The transport path preferably comprises at least one buffer section in which at least one of the at least one transport member can run, in order to change the density of the transport members along the transport path. Thus it would for example be possible to implement the system as a buffer, in which many individual runners can run into a buffer section, and depending on the density of the runners, a varying number of runners may be present in the buffer section.

It is advantageous to provide the transport path with windings that can be individually controlled, and to equip the transport members with permanent magnets. Individual transport members are here made to be as cost efficient as possible. In such a system, a unit for determining the position of at least one transport member and preferably of all transport members and for forwarding this to the controller is preferably provided on the transport path.

In a further embodiment, the transport members are provided with electric windings which apply the magnetic force necessary for the drive and which provide the transport path with permanent magnets or with non-switching electromagnets. In this connection, the electric energy necessary for the drive as well as the signals necessary for the control can be transferred to the individual transport members via transmission by induction. The controller may be arranged on the individual transport members on a decentralised basis, but central processing in a control unit is also possible.

It is advantageous if the transport path is implemented as a magnetic levitation route of a magnetic levitation system. Here, the at least one transport member can be fully magnetically mounted on the transport path, or the at least one transport member can be supported on the transport path partly magnetically and partly mechanically. In this connection it is possible for the mechanical support of the at least one transport member on the transport path to be implemented by means of slide bearings and/or rollers.

Advantageously, the apparatus comprises a plurality of transport members which move on and preferably also relative to the transport path. Advantageously, the movements of these transport members can be controlled individually from each other.

Preferably, the transport members are driven at least at times by means of a magnetic force. This is in contrast to the approaches so far known, where the transport members are usually arranged on rotating carriers.

Preferably, the transport unit additionally comprises a belt for driving the at least one transport member along sections of the transport path, on which the at least one transport member is moved at a constant speed. This movement may for example be a return movement in order to transport the transport members that are not occupied by containers or other piece goods back to the first container treatment apparatus.

The transport path may have any desired shape. Preferably, the transport path has a closed shape.

In a further advantageous embodiment, the apparatus, i.e. in particular the transport unit includes a turning unit that rotates the containers with regard to the longitudinal axis thereof or with regard to an axis that is parallel to this longitudinal axis about a predetermined turning angle.

This embodiment is particularly suitable for such containers which have a cross section that deviates from a circular cross section, such as for example rectangular or oval containers. Such containers are as a rule passed to a filling unit by way of air transport in the longitudinal direction. A transverse transport of such containers is avoided because the containers can easily turn in an air transport unit, which would lead to faults. It is known from the Applicant's internal prior art to correct any deviations from the longitudinal orientation during transfer from the outlet, for example from a blow moulding machine to a filling unit, by means of guiding members. In this connection, however, the longitudinal orientation is maintained. As a result, the longer side of the container determines the pitch in a filling unit or in a subsequent machine such as a labelling machine, an inspection machine, a steriliser or the like. A further disadvantage is the use of various format parts for each individual type of container.

In an advantageous embodiment, the first treatment unit is a blow moulding machine that moulds plastic preforms into plastic containers, and a second treatment apparatus is a filling machine that fills the containers, or a labelling machine.

It is further known from the prior art to carry out the turning of the containers from a longitudinal into a transverse transport orientation within an air transport unit in the inlet of a filling machine. To this end, the containers are turned during air transport in the inlet of the machine, for example by means of a worm gear. Although it is possible in this way to arrange a filling unit to be suitable for transverse transport of the containers, however, an air transport unit is needed. Such air transport units, however, are susceptible to faults and are in particular unsuitable for being used in block arrangements.

In this embodiment it is therefore proposed, in particular for transferring containers in a block, for example a block arrangement between a blow moulding machine and a filling machine, between a blow moulding machine and a labelling machine and a filling machine or a blow moulding machine, a filling machine and a labelling machine (respectively in this order), to turn the containers after the blow moulding machine in such a way that the containers can be treated in a transverse orientation in the subsequent machine(s). Therefore, in particular the transfer process is carried out, unlike air transport, in an interlocking manner (e.g. by means of gripping members). In this way, handling of the containers becomes more secure and further, faults during transfer can be avoided.

Advantageously, therefore, said turning is carried out during the transport of the containers. Advantageously, the turning unit is designed in such a way that the containers are rotated about an angle of approximately 90°. In this way, as mentioned above, the containers can be supplied transversely to the second treatment apparatus. Advantageously, the individual containers are here turned individually.

In principle it will be possible here for the transfer of the containers to be carried out by means of a chain having neck handling clamps. However, it would also be possible for the transfer of the containers to be carried out by linear transport and in particular by way of the above described magnetic movement of the individual guiding members. Preferably, the turning of the containers is carried out simultaneously, i.e. during the transport thereof, and particularly preferably, as was explained above, about approximately 90°. To this end, an additional controllable drive may be provided. This additional drive can here be used for separately turning each individual container.

In this context, apart from transfer, it would be conceivable to implement this additional drive also as a linear drive. It would also be possible for this separate turning of the individual containers to be carried out by way of a speed differential. In this connection, a clamp that grips the containers can be controlled or relaxed during the turning of the containers in such a way that a turn is enabled despite an interlocking connection. Thus, the clamp could be opened to such a degree that it is not open enough for the support ring of the containers to slip through the clamp, but sufficiently open for the container to be turned relative to the clamp.

If the containers are fed to the filling device in a transverse orientation, it is possible to select the filler pitch to be smaller. In this way, the filling machine can in its entirety be designed to be smaller and thus more cost efficient.

Apart from that, it would also be readily possible to automate a change to other container types, for example to round container types, in particular by way of selecting a different control program. In this way, there will then be no need to remove or readjust for example worm gears or other devices, which is the case in the prior art.

Further, said rotation could also be used for a targeted alignment of the containers in relation to a blow moulding machine. Such an alignment can here for example be carried out in relation to an ornament or another feature for subsequent labelling. Advantageously, at least one sensor unit or a detector such as a sensor or camera is provided for such an alignment, which preferably detects at least one area of the containers. Such an alignment in the transfer area eliminates the need for a complex alignment in the subsequent labelling machine.

It would further be possible to provide several of these turning units for example also in different areas within a block system. Thus it would be possible to carry out an exact alignment relative to a longitudinal run for a targeted labelling with self-adhesive labels by means of an ornament on the rear side of a broadside of the container. After the labelling process, an alignment relative to a filling unit could be carried out, in order to achieve a transverse run within the filling device.

In a further advantageous embodiment, the first treatment apparatus and the second treatment apparatus are interlocked with each other. Thus, for example, the transfer of the containers can be carried out in a block between a blow moulding machine and a filling machine using gripping members fixed here to runners as described, which gripping elements are in particular moved along a magnetic path. The advantage of this embodiment is, as mentioned above, that each runner or each filling member can be individually moved (and this is here based on a similar operating principle via a linear motor).

In a further advantageous embodiment, a further treatment unit for the containers is disposed along the transport path. In particular, due to the fact that the individual conveyor members are individually controlled, it becomes possible here for the containers to dwell at this further treatment unit or on several treatment units or on an additional assembly or on several additional assemblies for a longer period of time, and this additional assembly or these additional assemblies may be arranged in particular between a blow moulding machine and a filling unit. Apart from a serial arrangement, also a parallel arrangement of the units/assemblies or any desired combination of serial and parallel arrangements is conceivable. In this connection, the runners can be fed in and out individually via a switch-point system.

Thus, the treatment unit may for example be a cooling unit or several cooling units for cooling the containers. It is possible here to design the cooling section to be shorter than in the prior art and for the containers to be transported through this cooling section at a correspondingly slower speed. Moreover, the further treatment unit may also be an inspection unit for inspecting the containers. Here, too, the individual transport using the individual contained members can be used to extend the time for inspection.

In a further advantageous embodiment, also at least one drive and particularly advantageously an additional drive may be provided next to or on a transport member.

In a further embodiment, the further treatment unit may be a sterilisation unit for sterilising the containers. It would also be possible here to extend the sterilisation time by carrying out the transport at a correspondingly slower speed.

Moreover, it is also possible for the further treatment unit to be a dating unit that affixes a date to the containers. The further treatment unit may also already be a labelling machine that is disposed, as mentioned, along the transport path. The further treatment unit may also be a printing unit that makes an imprint on the containers.

Further, it would also be possible to arrange several of said treatment units along the transport path.

In a further embodiment it would also be possible for said further treatment unit to be a turning unit that turns the plastic containers, in particular with regard to the longitudinal axis thereof. It would also be possible for the transfer, or the transfer section, to be extended to allow a better adaptation of additional assemblies, by deviating in particular from a direct connection between the treatment apparatus.

In order to achieve additional movements it would also be conceivable to equip the respective runners or conveyor members with additional drives, in particular servo drives. In this connection, for example linear or rotary drives could be used in order to fasten equipment members to these drives. In this way superimposed movements become possible which allow for example a greater distance of the magnetic path to a blow mould and a more favourable adaptation of a gripping movement when removing the container. It would be conceivable here for a transfer of energy to be carried out in a contactless or wireless manner.

Apart from that it would also be conceivable to provide in particularly an extendable support for an in particular rotationally non-symmetrical container for removing it from the blow mould, in order to avoid an undefined turning of the container and in order to avoid in this way the need for an alignment device. Such an additional movement could be used for carrying off containers. In this way it is possible to dispense with complex mechanical structures such as for example bearings, drives and a pitch delay for the respective transport stars. Further, in this way the transfer points of the containers from one transport unit to the next, for example from one transport star to the next, are avoided. Moreover, it is also possible to design the additional assemblies to be better adaptable and to be more cost efficient.

In a further advantageous embodiment it is conceivable for a sterile room to be provided, within which the containers can be transported by the transport apparatus. Thus, for example, the transport path could be surrounded by an annular and/or in particular also a channel-type sterile room, with the size of the sterile room preferably being adapted such that on the one hand the containers can be transported through this sterile room and on the other hand the size of the sterile room does not substantially exceed the dimensions of the containers, so that clean room volume may be saved. It would also be conceivable here that the clean room occupies only that section through which containers are actually transported, however, it would also be conceivable for the entire transport path, as mentioned, to extend through the clean room, in order to avoid in this way in particular contamination of the respective gripping members or conveying members. It would also be possible here for such a clean room to extend up to a filling unit or to start as early as from the blow moulding machine. In this way, a sterile treatment of containers starting from the production thereof up to the completion of the filling and closing process is conceivable.

An exemplary container treatment system comprises a first container treatment apparatus for treating containers, a second container treatment apparatus that is disposed downstream of the first treatment apparatus and is used for treating the containers following a treatment by the first container treatment apparatus, and a transport unit as described above.

An exemplary transport method is used for transporting containers in a container treatment system comprising a first container treatment apparatus for treating containers and a second container treatment apparatus that is disposed downstream of the first treatment apparatus and that is used for treating the containers following a treatment by the first container treatment apparatus. The method comprises the following steps: transporting the containers along a transport path arranged over its entire length between the first and second container treatment apparatus from the first container treatment apparatus to the second container treatment apparatus by means of at least one transport member that is mounted or supported on the transport path so as to be movable and that holds a container, and preferably for compensating a difference in the speed of transport of the containers in the first and second container treatment apparatus along the path of the at least one transport member between the first and second container treatment apparatus.

Preferably, the relative speed of the transport member in relation to the transport path is modified.

BRIEF DESCRIPTION OF THE DRAWINGS

The invention will be described in more detail below with reference to the attached drawing and by means of embodiment examples, wherein.

DETAILED DESCRIPTION

First Embodiment

Figure 1:
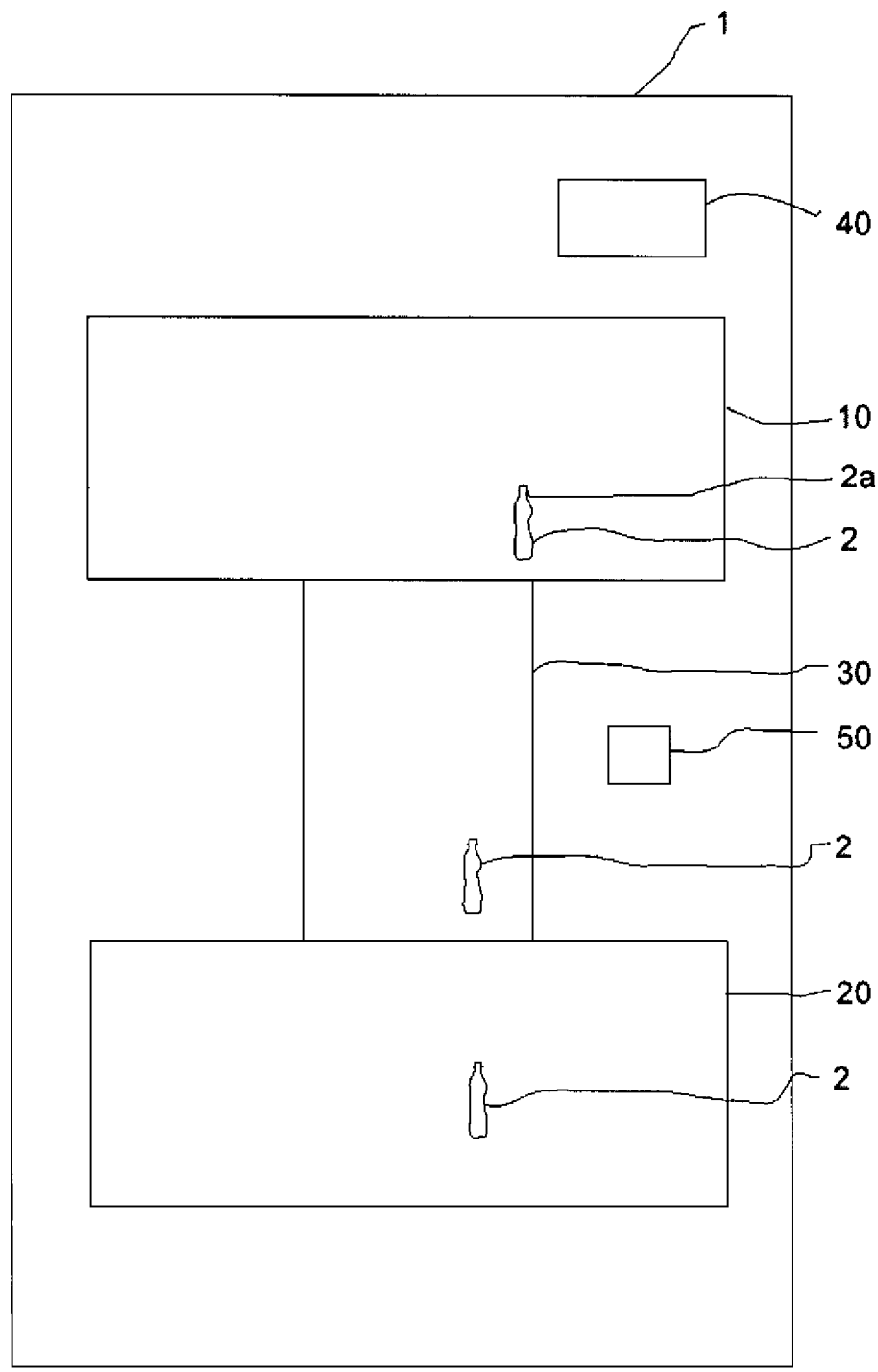
FIG. 1 shows a schematic view of a container treatment system according to a first embodiment of the present invention.

FIG. 1 shows a container treatment system 1 for treating containers 2 which have a neck ring 2a. The container treatment system 1 comprises at least one first treatment apparatus 10, a second treatment apparatus 20, a transport unit 30 arranged between the first and second treatment apparatus 10, 20, a control device 40 and a detection unit 50.

The first treatment apparatus 10 is used for treating containers 2 and can for example be a heating device that heats plastic preforms to a temperature suitable for a stretch blow moulding process. The second treatment apparatus 20 is also used for treating containers 2 and may for example be a stretch blow moulding apparatus that exposes the container 2 heated by the heating device, i.e. the first treatment apparatus 10, to a stretch blow moulding process. This means that the treatment of containers 2, which can be carried out by the first and second treatment apparatus 10, is a predetermined type of treatment.

The control device 40 controls the treatment of the containers 2 carried out by the container treatment system 1 and thus controls also processes between the first and second treatment apparatus 10, 20 and the operation of the transport unit 30. Optionally, the control device 40 also controls the operation of the first and second treatment apparatus 10, 20, where these are not equipped with their own control device, which are in turn subordinate to the control device 40 (master) and are controlled thereby.

The detection unit 50 is used for detecting a movement and/or a position of members of the transport unit 30, as will be described in more detail below.

Figure 2:
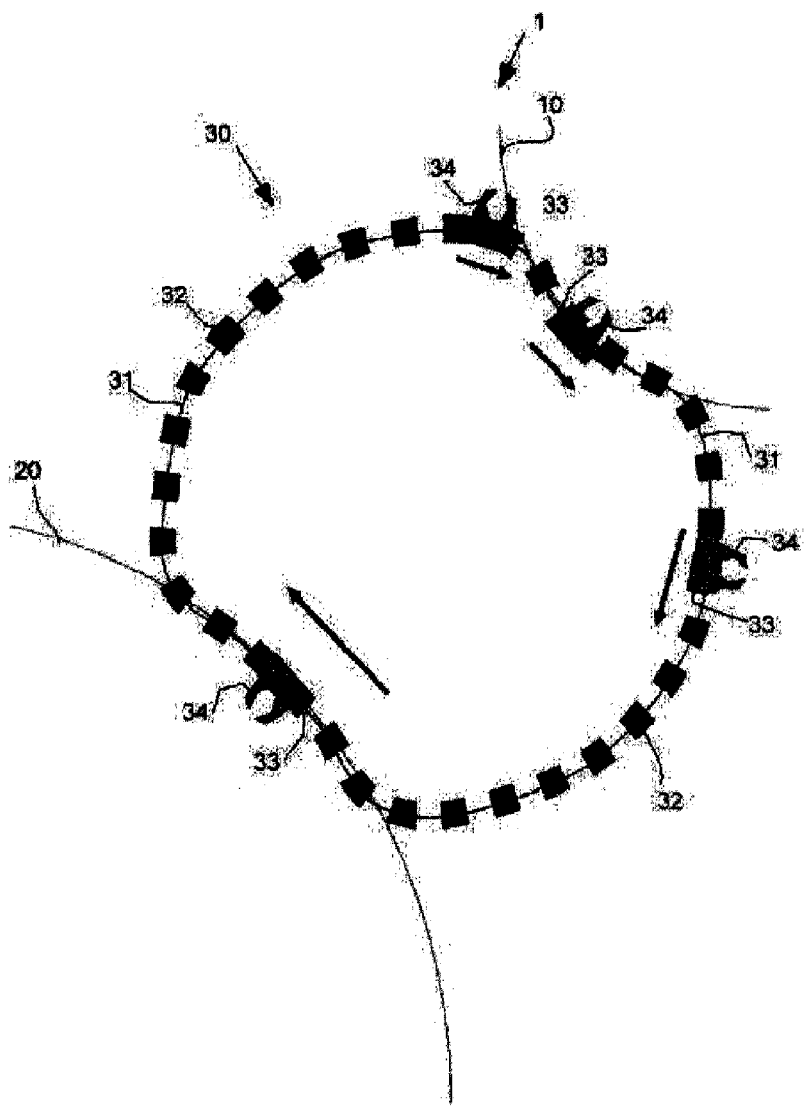
FIG. 2 shows a top view of a transport unit in a container treatment system according to the first embodiment of the present invention.

As shown in FIG. 2, the transport unit 30 arranged between the first and second treatment apparatus 10, 20 comprises a transport path 31, wherein electromagnets 32 are lined up along the path like on a string of pearls. For the sake of clarity, only some of the electromagnets shown in FIG. 2 are provided with reference numerals. FIG. 2 shows arranged along the transport path 31 four transport members 33 for holding and transporting containers. The transport members in FIG. 2 are provided with a retaining clamp 34 for holding and transporting individual containers 2. The retaining clamp 34 can grip and hold the containers 2, as described in the prior art, above or below the neck ring of the container 2. The transport members 33 together with the retaining clamp 34 move along the transport path in the direction of the arrows shown in FIG. 2. Even if only a movement of the transport members 33 is mentioned below, it goes without saying that the retaining clamps 34 move together with the transport members 33 if the transport members 33 do not hold the containers 2 themselves, but are provided for this purpose with a retaining clamp 34 for holding the containers 2.

In FIG. 2, the transport path 31 has the approximate shape of an apple, i.e. the beginning and the end of the transport path 31 directly merge into each other. In other words, the transport path 31 forms a closed and continuous transport route or circular path. Moreover, the closed transport path 30 is arranged completely, or over its entire length, between a first and second container treatment apparatus 10, 20. In this way, the containers 2 can be transported from the first container treatment apparatus 10 to the second container treatment apparatus 20. Moreover, the transport members 33 only need to travel over a short distance, in order to get from the second container treatment apparatus 20 back to the first container treatment apparatus 10 for another transport of containers 2 from the first container treatment apparatus 10 to the second container treatment apparatus 20.

The transport of containers 2 in the first and second container treatment apparatus 10, 20 is carried out for example by means of conventional transport stars, which are indicated in FIG. 2 as part of a circle and to which the transport members 33 of the transport unit 30 hand over the containers 2 once they reach the first or second container treatment apparatus 10, 20.

The transport members 33 of the transport unit 30, or the speed thereof, can be separately controlled by the control device 40 in such a way that any speed differences in the transport of the containers 2 in the first and second container treatment apparatus 10, 20 can be compensated. To this end, the transport members 33 can be accelerated, decelerated or completely stopped on the transport path 31 as needed. In addition, also an intermittent movement in the opposite direction of movement would be conceivable, for example for buffering purposes. The transport members 33 may also run at a slower speed v in some sections of the transport path 31 than in other sections.

Preferably, the retaining clamps or gripping members 34 are active, i.e. controllable, gripping elements, the opening or closing movement of which can be controlled.

Figure 3:
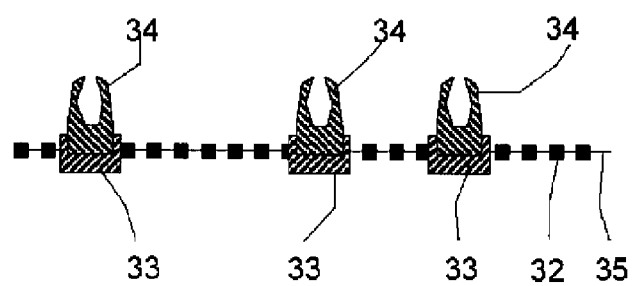
FIG. 3 shows a top view of a transport unit in a container treatment system according to a modification of the first embodiment of the present invention.

Moreover, the transport members 33 can be allowed to run into a buffer section 31, as shown in FIG. 3, of the transport path 31, as a result of which the density of the transport members 33 along the transport path 31 can be reduced. Thus, the individual transport members 33 can be run at a higher or lower speed v than is the case if all of the available transport members 33 circulate along the transport path 31 at the same time. This means that the transport members 33 can compensate on their way from the first to the second container treatment apparatus 10, 20 any speed differences between various transport speeds of the containers 2 present in the first and second container treatment apparatus.

Each of the transport members 33 can be separately controlled by the control device 40 in such a way that the speed thereof along the transport path 31 respectively corresponds to the tangential speeds of the first and second container treatment apparatus 10, 20. This means that the transport members 33 run through the control device 40 in a controlled manner along the transport path 31 and are accelerated or decelerated.

In this process, the current position of a respective transport member 33 is preferably determined by means of the detection unit 50 and is adapted via a controller to a preset position specified by the control device 40. Moreover, each or just one or more of the transport members 33 can run against a stop circulating together with the first and second treatment apparatus 10, 20, in order to adhere in this way exactly to a transfer position on the first and second treatment apparatus 10, 20.

The transport path 31 preferably is a magnet route or a magnet levitation route, along which the transport members 33 are moved by a magnetic force and thus respectively correspond to a magnetic path or magnetic levitation path individually movable along the magnetic route. This is achieved by means of polarising the electromagnets 32 as needed via the control device 40, in order to move the transport members 33 along the path at the desired speed v.

Figure 4:
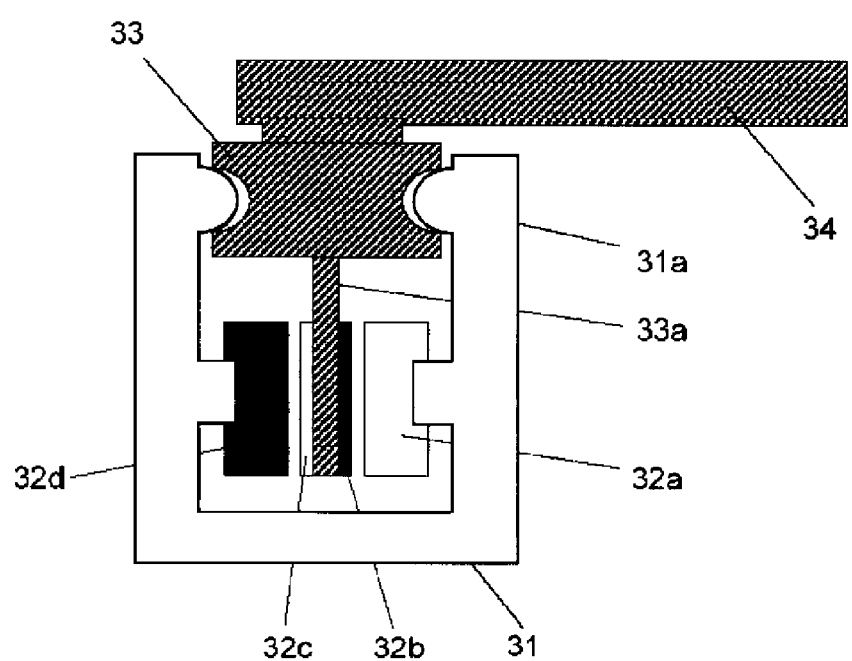
FIG. 4 shows a lateral view of a transport member of a transport path of the transport unit according to the first embodiment of the present invention.

The transport members 33 may be supported on the transport path 31 either fully magnetically, which means on an air cushion between the transport path 31 and the transport member 33, or partly magnetically and partly mechanically using slide bearings and/or rollers, as shown in FIG. 4. To this end, the transport path 31 has a guiding member 31a, on which the transport member 33 is magnetically and/or mechanically supported. To this end, the form of the transport member 33 is correspondingly adapted to the form of the guiding element 31a. The mechanical support using rollers is shown for example in DE 41 33 114 A1.

Moreover, it can be seen from FIG. 4 that the clamp 34 is mounted at the top of the transport member 33 and that a bottom part 33a of the transport member 33 is guided past one of the electromagnets 32, which is an electromagnetic drive element, and consists of a first to fourth electromagnetic driving elements 32a to 32d. This means that in the case of the transport unit 30, the transport members 33 are magnetically driven.

In this way, if very large preforms are to be heated in a heating unit as the first treatment apparatus 10, the containers 2 can be made to run through the heating unit at half the speed compared to preforms of a normal size. At the same time, the stretch blow moulding apparatus as the second treatment apparatus 20 can then carry out the stretch blow moulding process at the same speed as with preforms of a normal size, however, only every other blow mould will be loaded with a container heated by the heating device, i.e. the first treatment apparatus 10. By means of a simple modification of the control of the transport members 33 of the transport unit 30, the transport members 33 can in this case bridge their present speed difference between the first and second treatment apparatus 10, 20.

The treatment unit 30 can be arranged either as a separate unit between the first and second treatment apparatus 10, or the transport unit 30 can be part of the first or second treatment apparatus 10. In the latter case, the expression "arranged between the first and second treatment apparatus 10" is to be understood to mean "arranged between a treatment unit of the first treatment apparatus 10 and a treatment unit of the second treatment apparatus 20", since the first and second treatment apparatus 10, may also respectively include transport stars or straight transport sections, which lead the containers 2 to and then away again from the actual treatment unit of the treatment apparatus.

In the first embodiment, a transport unit 30 of a container treatment system 1 is shown which is not subject to a rigid travel-time profile for the transport of containers 2, but has a variable travel-time profile for the transport of containers 2. Moreover, the transport path 31 may have any desired shape and the transport path 31 and any one or more buffer sections only need to be so long as is required for bridging the difference in speed between the first and second container treatment apparatus 10, 20. Thus, the transport unit 30 is very cost efficient.

Second Embodiment

The transport unit 30 according to the second embodiment has the same parts as the ones shown in FIGS. 1 to 4. Therefore, the same and equivalent parts in both embodiments were identified with the same reference numerals.

The difference between the first and second embodiment examples is that in the present embodiment example, the drive of the transport members 33 along the transport path 31 is carried out not just purely electromechanically via electromagnets 32. Therefore, it is only this difference that will be described below.

Figure 5:
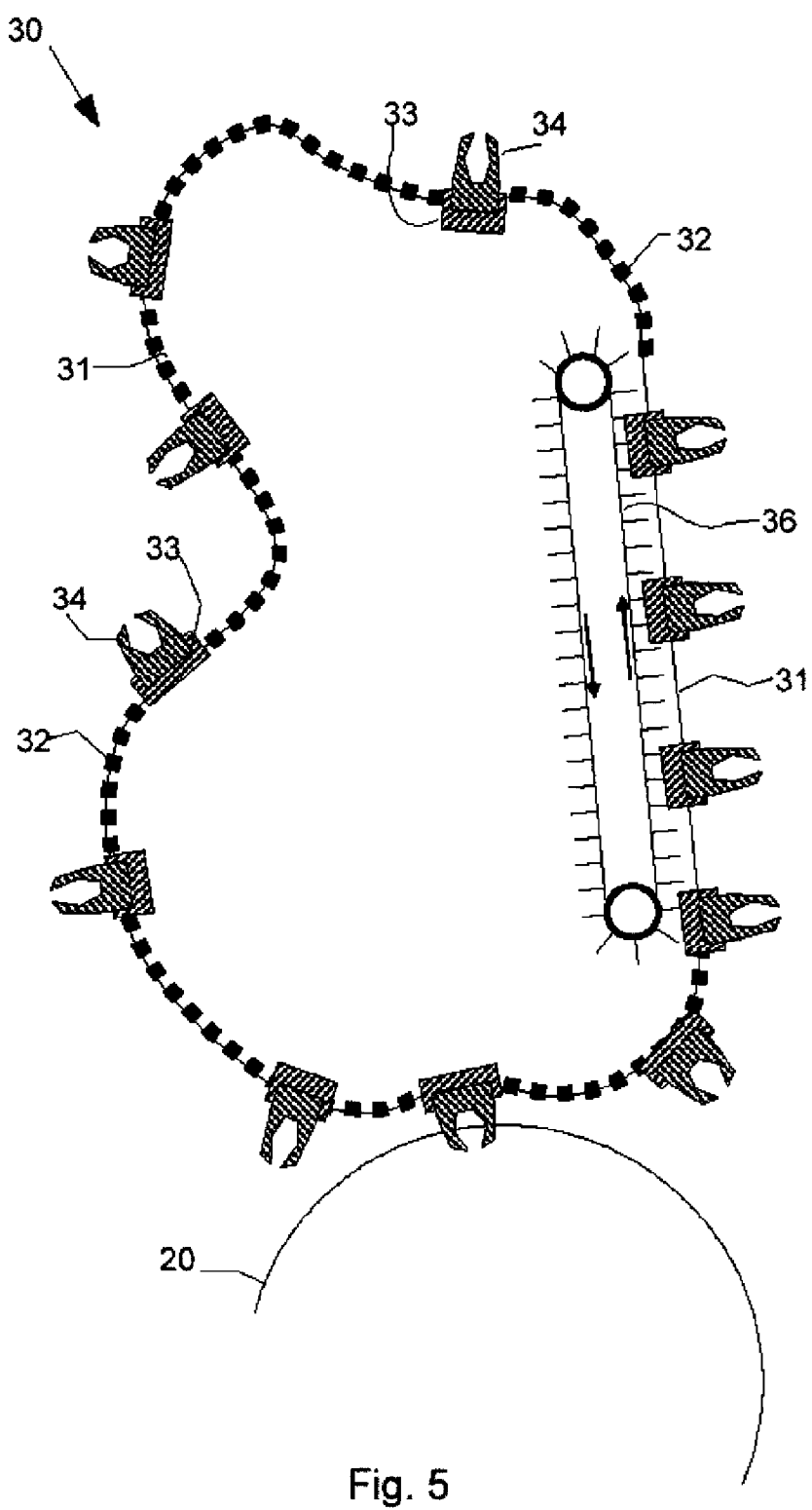
FIG. 5 shows a top view of part of a transport unit in a container treatment system according to a second embodiment of the present invention.

In addition to the drive of the transport members 33 along the transport path 31 by means of electromagnets 32, the transport members 33 may also be driven along straight sections of the transport path 31 using a belt 36 as shown in FIG. 5. This is advantageous in particular in the case of longer straight sections, along which the transport members 33 move at a constant speed v.

The control device 40 can then establish the speed of the belt 36 relative to the speed of the transport members 33 in the other sections of the transport path 31 as required.

Since the costs for a belt 36 for driving the transport members 33 along the transport path 31 are generally lower than the costs for equipping the transport path 31 with electromagnets 32 for driving the transport members 33 along the transport path 31, the costs for the transport unit 30 can be further reduced in this way.

(General Remarks)

All of the above described embodiments of the transport unit, the container treatment system and the transport method can be applied individually or in any possible combination. Here, in particular the following modifications are conceivable.

The transport path 31 can in principle be of any desired shape. Therefore, the transport path 31 can for example, as an alternative to the shape shown in FIG. 2, also have the shape of a circle, of a rectangle or a square with preferably rounded corners, an ellipse, a spiral, a figure of eight etc. In particular, the transport path 31 can also bridge a longer straight piece or a spiral. The transport path 31 can in particular carry out a vertical or horizontal change of direction. Here, any possible combinations of these and other conceivable shapes can be realised.

There may be any desired number of transport members 33 along the transport path 31, as long as at least one transport member 33 is provided. Preferably, the length of the transport path 31 is matched to the number of transport members 33, in order to be able to compensate any differences in speed present in the container treatment system 1 between containers 2 being transported in the individual container treatment apparatus 10, 20.

The containers 2 may be preforms, plastic containers made from preforms by way of a stretch blow moulding process, for example plastic bottles, glass bottles, cans etc. However, it is also possible for the containers 2 to be containers 2 that have already been placed on pallets. In any case, the transport path 31 and transport members 33 are to be matched to the respective load to be transported. In addition, the retaining members for the containers 2 may if required not be implemented as retaining clamps 34, but for example as hooks, into which a transport belt laid around the pallets can be inserted. It would also be possible to design the retaining members for the containers 2 not as retaining clamps 34, but as grippers for example in the shape of a fork that can engage in the pallets. There is also no need to form the containers with a neck ring 2a, such as for example cans. In such a case, the retaining clamp 34 is to be suitably designed and to be provided for example with a non-slip coating.

Instead of a heating device, the first container treatment apparatus 10 may also be a cleaning device for cleaning the containers 2, and instead of a stretch blow moulding apparatus, the second container treatment apparatus 20 may be a filling device for filling the containers for example with a liquid, in particular a beverage. A further possibility would be for the first container treatment apparatus 10 to be a stretch blow moulding apparatus, whereas the second container treatment apparatus 20 could be a labelling device for labelling the containers 2. It would also be possible for the first and second treatment apparatus 10, 20 respectively to be a cleaning device, which could optionally carry out different cleaning processes on the containers. The first and second treatment apparatus 10, could also respectively be labelling devices. Here, too, all other combinations of treatment devices of a treatment system 1 would be conceivable.

Figure 6:
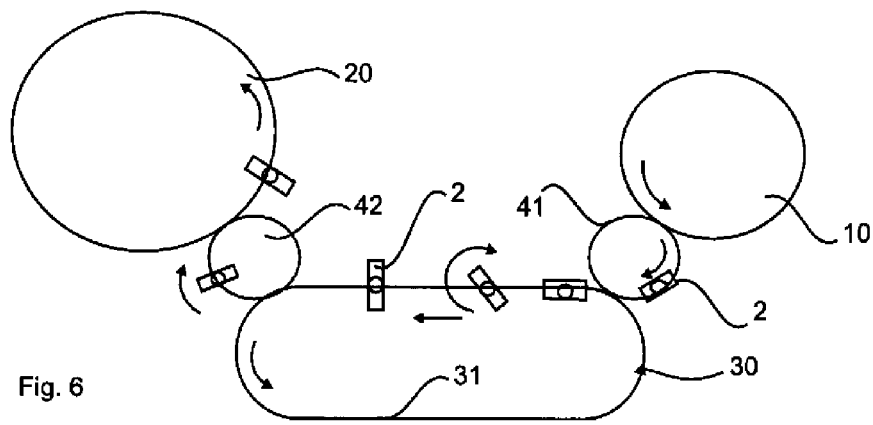
FIG. 6 shows a further embodiment of an apparatus according to the invention, wherein the transport apparatus is arranged between a blow moulding machine and a filling unit.

FIG. 6 shows a further embodiment of an apparatus according to the invention. Here, the first treatment apparatus 10 is a blow moulding machine and in particular a stretch blow moulding machine 10 which moulds plastic preforms into plastic containers. This blow moulding machine has here advantageously connected upstream thereto an oven through which the plastic preform is passed and thus heated. Reference numeral 41 identifies the transfer star which feeds the containers 2 to the transport unit 30, and reference numeral 42 identifies a further transfer star that feeds the containers to the second container treatment apparatus 20. In this embodiment, the containers have a cross section that deviates from a circular cross section. It can be seen that the containers are fed to the conveyor unit 30 in a longitudinal orientation and are rotated about 90° within the conveyor unit, i.e. along the transport path, and are subsequently fed in a transverse orientation to the second treatment apparatus 20, i.e. here the filling machine. Thus, a linear transport with a turn is carried out here.

Figure 7:
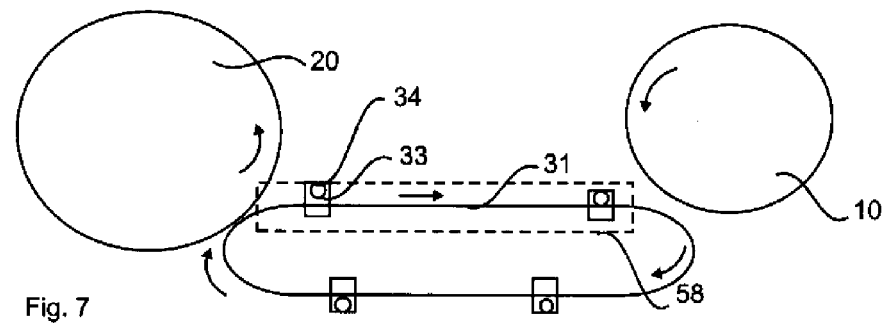
FIG. 7 shows a further embodiment of the apparatus shown in FIG. 6.

FIG. 7 shows a further embodiment of an apparatus according to the invention. Here, in particular the transport members 33 can again be seen, which are here respectively gripping members 34 for gripping the containers. In the case of the embodiment shown here, the containers are transported in a clockwise direction, i.e. here not along the shortest possible section between the first treatment apparatus 10 and the second treatment apparatus 20. This may in particular be desired in situations where another treatment of the container is to be carried out during the transport thereof. What is also advantageous here is that no additional transfer stars (41, 42) as shown in FIG. 6 are needed, or the apparatus can go without any further transfer stars.

Figure 8:
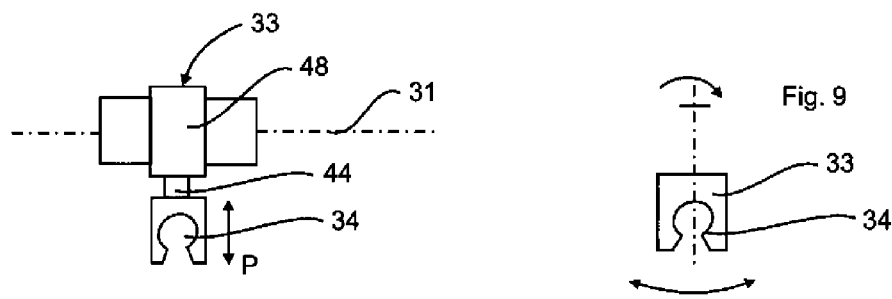
FIG. 8 shows a detailed view of a gripping element.

FIG. 8 shows a detailed view of transport member 33 that is moved relative to the transport path 31 (schematically illustrated). In particular a carrier 44 is provided here, on which the gripping element 34 is disposed. Reference numeral 48 identifies a linear drive, by means of which the gripping element 34 can be moved along the double arrow P. As a result of this linear movability of the gripping element, in particular also a hand-over of the containers to the second treatment apparatus or also a take-over of the containers from the first treatment apparatus 10 can be facilitated.

Figure 9:
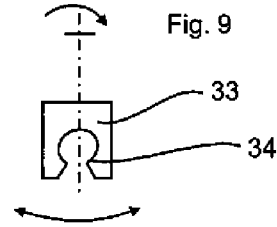
FIG. 9 shows a view for illustrating a turning or pivoting movement.

FIG. 9 shows a further embodiment, where the gripping element 34 can here be pivoted or turned along the double arrow P1. To this end, a rotary drive 54 (only schematically shown) may be provided, by means of which the gripping member 34 can be pivoted about a pivot axis S. In this design, the container itself is not pivoted about its central longitudinal axis, but about an axis parallel thereto. However, it would also be possible that the gripping member 34 can be turned in such a way that also a rotation of the container about its own axis is carried out. Instead of the gripping elements shown here, it would also be possible for retaining arms to be provided, which engage in a mouth of the containers so as to transport them in this way. Also such retaining arms may here be arranged to be rotated, for example by means of servomotors.

Figure 10:
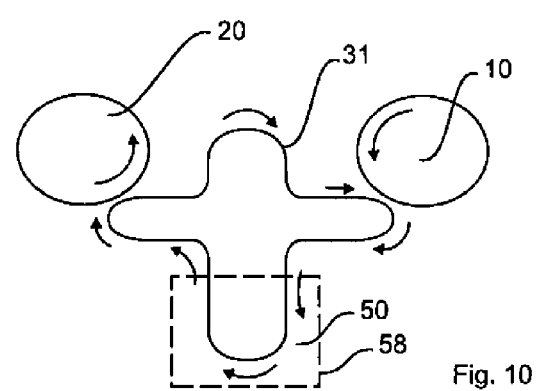
FIG. 10 shows a further embodiment of an apparatus according to the invention.

FIG. 10 shows a further embodiment of the present invention. In this embodiment, a further treatment unit 50 is provided, such as in particular an additional assembly. This additional assembly may for example be a cooling unit, an inspection unit, an alignment unit, a sterilisation unit or the like. It can be seen here that the transport path is considerably extended in order to transport the containers also through this further treatment unit 50. This further treatment unit 50 may here include a sterile room 58, so that the containers are also transported in this sterile room. Similarly, FIG. 6 also shows a sterile room 58 (only schematically shown), through which the containers are carried. As explained above, this sterile room may also extend over the entire length of the transport path 31. It would further also be possible for special sterilisation units to be provided, which are used to regularly sterilise the gripping members, for example by applying a sterilisation medium thereto.

LIST OF REFERENCE NUMERALS

1 Container treatment system
2 Container
2a Neck ring
10 First treatment apparatus
20 Second treatment apparatus
30 Transport unit
31 Transport path
31a Guiding member
32 Electromagnet
32a First electromagnetic drive member
32b Second electromagnetic drive member
32c Third electromagnetic drive member
32d Fourth electromagnetic drive member
33 Transport member
33a Bottom part of transport member 33
34 Retaining clamp, gripping member
35 Buffer section
36 Belt
40 Control device
41, 42 Transfer star
44 Carrier
48 Linear drive
50 Treatment unit
54 Rotary drive
58 Clean room
P, P1 Double arrow
S Pivot axis

What is claimed is:

1. A transport unit for transporting containers in a container treatment system, having a first container treatment apparatus for treating containers and a second container treatment apparatus disposed downstream of the first treatment apparatus, the second container treatment apparatus being used for treating the containers following a treatment by the first container treatment apparatus, the transport unit comprising:
    a transport path which is arranged between a first container treatment apparatus and a second container treatment apparatus
    and along which the containers can be transported from the first container treatment apparatus to the second container treatment apparatus; and
    at least one transport member that is movably mounted on the transport path for holding and transporting a container, wherein;
    the transport path and the at least one transport member are structured and arranged such that the at least one transport member is capable, at least at times, of compensating, by varying a velocity of the transport member in a direction of the transport path, on its path between the first and second container treatment apparatus a difference in transport speed of the containers in the first and second container treatment apparatus; and
    movements of the transport path and the at least one transport member are controllable independently from each other.

2. The transport unit as claimed in claim 1, wherein the at least one transport member is at least at times driven by means of a magnetic force.

3. The transport unit as claimed in claim 1, wherein the transport path comprises at least one buffer section, in which at least one of the at least transport member is capable of running in order to modify the density of the transport members along the transport path.

4. The transport unit as claimed in claim 1, wherein a temperature difference exists between the first container treatment apparatus and the second container treatment apparatus.

5. The transport unit as claimed in claim 1, wherein the at least one transport member is supported fully magnetically along the transport path.

6. The transport unit as claimed in claim 1, wherein the at least one transport member is supported partially magnetically and partially mechanically along the transport path.

7. The transport unit as claimed in claim 1, further including a belt for driving the at least one transport member in sections of the transport path, on which the at least one transport member is moved at a constant speed.

8. The transport unit as claimed in claim 1, wherein the transport path has any desired shape.

9. The transport unit as claimed in claim 1, wherein the apparatus includes a turning unit that rotates the containers in relation to the longitudinal axis thereof about a predetermined turning angle.

10. The transport unit as claimed in claim 1, further comprising at least one further treatment unit for containers arranged in either series or parallel along the transport path.

11. The transport unit as claimed in claim 1, further comprising an additional drive provided on a transport member.

12. A container treatment system comprising:
    a first container treatment apparatus for treating containers;
    a second container treatment apparatus disposed downstream of the first treatment apparatus, the second container treatment apparatus being used for treating the containers following a treatment by the first container treatment apparatus, wherein a temperature difference exists between the first container treatment apparatus and the second container treatment apparatus; and
    a transport unit as claimed in claim 1.

13. The transport unit of claim 1, wherein within the at least one buffer section are located a plurality of individual runners, and a varying number of runners are present in the buffer section depending on a density of the individual runners.

14. The transport unit of claim 1, wherein the transport path comprises individually controllable windings, and wherein the at least one transport member is equipped with permanent magnets.

15. The transport unit of claim 1, further comprising a unit for determining a position of the at least one transport member and forwarding the position to a controller.

16. The transport unit of claim 1, wherein the at least one transport member is separately controlled by a control device so that a speed of the at least one transport member along the transport path corresponds to tangential speeds of the first container treatment apparatus and the second container treatment apparatus, wherein the at least one transport member runs through the control device in a controlled manner along the transport path and is accelerated or decelerated.

17. The transport unit of claim 16, wherein control devices are the control device is arranged on individual transport members on a decentralized basis.

18. The transport unit of claim 1, wherein the at least one transport member includes a retaining clamp for holding and transporting individual containers.

19. The transport unit of claim 18, wherein the retaining grips and holds individual containers above or below a neck ring of the individual containers.

20. The transport unit of claim 18, wherein the retaining claim grips and holds individual containers by sides of the individual containers.

21. A transport unit for transporting containers, the transport unit comprising:
- a transport path between a first container treatment apparatus and a second container treatment apparatus, and along which containers can be transported from the first container treatment apparatus to the second container treatment apparatus, wherein:
- the first container treatment apparatus treats the containers; and
- the second container treatment apparatus is disposed downstream of the first treatment apparatus, and the second container treatment apparatus treats the containers following a treatment by the first container treatment apparatus; and
- at least one transport member movably mounted on the transport path for holding and transporting a container,
- wherein the at least one transport member is controlled separately from the transport path, wherein control of the at least one transport member occurs by an electronic control device so that a speed of the at least one transport member along the transport path corresponds to tangential speeds of the first container treatment apparatus and the second container treatment apparatus, wherein the at least one transport member runs through the electronic control device in a controlled manner along the transport path and is accelerated or decelerated, and
- wherein the transport path and the at least one transport member are structured and arranged such that the at least one transport member is capable, at least at times, of compensating, by varying a velocity of the transport member in a direction of the transport path,
- on its path between the first and second container treatment apparatus a difference in transport speed of the containers in the first and second container treatment apparatus.

22. A method for transporting containers the method comprising:
- transporting the containers along a transport path arranged between a first container treatment apparatus and a second container treatment apparatus using at least one transport member movable along the transport path and that can hold a container, wherein the at least one transport member is one of a plurality of transport members, the movements of which are controllable independently from movement of the transport path, wherein:
- the first container treatment apparatus treats the containers; and
- the second container treatment apparatus is disposed downstream of the first treatment apparatus, and the second container treatment apparatus treats the containers following a treatment by the first container treatment apparatus; and
- compensating a difference in transport speed of the containers in the first container treatment apparatus and the second container treatment apparatus on the path of the at least one transport member between the first and second container treatment apparatus by varying a velocity of the at least one transport member in a direction along the transport path.

* * * * *